Fig. 1

Jan. 5, 1954 N. E. GADDINI 2,664,932
FRUIT HALVING AND PITTING MACHINE
Filed Dec. 14, 1951 7 Sheets-Sheet 2

Fig. 2

INVENTOR
*N. E. Gaddini*

BY *Lechter Nochter*
ATTORNEYS

Fig. 4

Jan. 5, 1954  N. E. GADDINI  2,664,932
FRUIT HALVING AND PITTING MACHINE
Filed Dec. 14, 1951 7 Sheets-Sheet 5

INVENTOR
*N. E. Gaddini*
BY
ATTORNEYS

Jan. 5, 1954

N. E. GADDINI 2,664,932

FRUIT HALVING AND PITTING MACHINE

Filed Dec. 14, 1951

INVENTOR

N. E. Gaddini

BY *(signature)*

ATTORNEYS

Jan. 5, 1954

N. E. GADDINI 2,664,932

FRUIT HALVING AND PITTING MACHINE

Filed Dec. 14, 1951

INVENTOR
N. E. Gaddini
BY
ATTORNEYS

Patented Jan. 5, 1954

2,664,932

UNITED STATES PATENT OFFICE 2,664,932

FRUIT HALVING AND PITTING MACHINE

Norman E. Gaddini, Winters, Calif.

Application December 14, 1951, Serial No. 261,626

15 Claims. (Cl. 146—28)

This invention is directed to, and it is a major object to provide, an improved fruit halving and pitting machine; the same being especially designed—but not limited—for use with peaches and apricots.

Another important object of the present invention is to provide a fruit halving and pitting machine which embodies a novel, longitudinally extending cyclic carrier mounting both a fruit holder and a pit ejection unit for vertical relative oscillation between a separated position for fruit loading and circumferential cutting of the fruit about the pit, and an adjacent cooperative position for pit ejection.

A further object of the invention is to provide a fruit halving and pitting machine wherein the longitudinally extending carrier is mounted and actuated cyclically—in a vertical longitudinal plane—so as to not only vertically relatively oscillate the fruit holder and pit ejection unit, as in the preceding paragraph, but also to reciprocate said parts simultaneously in a longitudinal direction whereby, while such parts are maintained in the same relative positions for working cooperation, the fruit can be initially loaded on the holder, and the halved pitted fruit stripped therefrom, at longitudinally spaced points; i. e. front and rear points, respectively.

An additional object of the invention is to incorporate in the fruit halving and pitting machine novel mechanisms to load the fruit holder, and to cut the fruit holder supported fruit circumferentially about the pit at predetermined points in the oscillatory cyclic operation of such machine.

Other objects of the invention are to provide novel actuating mechanism for the cyclic carrier; to provide a cyclic carrier and actuating mechanism assembly which is positive but smooth in operation; and to provide a machine which requires a minimum of servicing and maintenance.

A still further object of the invention is to provide a fruit halving and pitting machine which has a substantial capacity.

It is also an object of the invention to provide a fruit halving and pitting machine which is designed for ease and economy of manufacture, and convenience of operation.

Still another object of the invention is to provide a practical and reliable fruit halving and pitting machine, and one which will be exceedingly effective for the purpose for which it is designed.

These objects are accomplished by means of such structure and relative arrangement of parts as will fully appear by a perusal of the following specification and claims.

Referring now more particularly to the characters of reference on the drawings, the novel fruit halving and pitting machine comprises a rigid, upstanding main frame, indicated generally at 1; such main frame being of open or skeleton construction.

Within the main frame 1 the machine is fitted with a cyclic carrier, indicated generally at 2;

such cyclic carrier being comprised of transversely spaced, longitudinally extending lower arms 3 and transversely spaced, longitudinally extending upper arms 4.

Each pair of such arms is suitably connected together in rigid relation, and at their rear ends the arms 3 and 4 are pivotally connected, as at 5, and thence extend forwardly in diverging relation in a longitudinal vertical plane.

The upper arms 4 always extend at the same forward and upward incline, being longitudinally slidably supported by slide bearings 6 fixed in connection with correspondingly inclined frame members 7.

The rigidly-connected lower arms 3 have an upstanding A-frame 8 fixed in connection therewith, and such A-frame is pivotally coupled, as at 9, at its apex, to the outer end of the crank arms 10 of a crank shaft 11; such crank shaft 11 being suitably journaled in the main frame 1 and driven at relatively slow speed by an endless chain and sprocket unit 12 from a reduction gear box 13 actuated by an electric motor 14, both mounted atop the main frame 1.

With the crank shaft 11 disposed above the lower arms 3 and ahead of the rear end pivotal connection 5 between said lower arms 3 and upper arms 4, the action which said crank shaft imparts to the cyclic carrier 2 is a simultaneous scissors-like oscillation of the lower arms 3 relative to the upper arms 4, and a longitudinal reciprocation of the entire carrier; the upper arms 4 sliding in the bearings 6 to permit of said reciprocation.

At the forward ends thereof the lower arms 3 support a "flying" fruit holder, indicated generally at 15, while at the forward ends of the upper arms 4 the latter support a pit ejection unit, indicated generally at 16; the fruit holder 15 and the pit ejection unit 16, by reason of the structure of the cyclic carrier 2, always remaining in the same relative positions regardless of the extent or position of longitudinal reciprocation of said carrier.

Flying fruit holder

Figure 8:
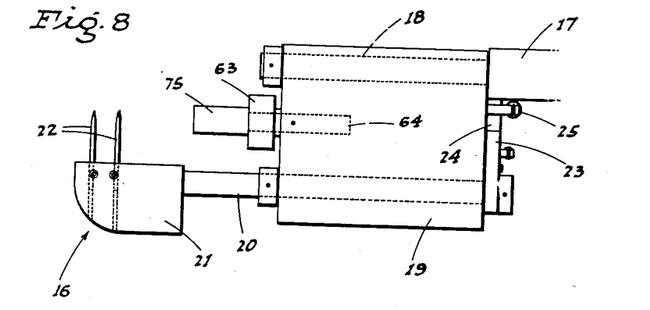
Fig. 8 is an enlarged fragmentary side elevation of the fruit holder.

The flying fruit holder 15 comprises a transverse mounting block 17 fixed on the forward ends of the lower arms 3; the latter converging forwardly to such block.

A pair of transversely spaced, forwardly projecting shafts 18 are fixed on the mounting block 17, and laterally swingable pendulum blocks 19, rectangular in side elevation, are journaled on and depend from the shafts 18.

The shafts 18 extend through the laterally swingable pendulum blocks 19 adjacent and parallel to their upper edges, while other longitudinal shafts 20 are journaled in said blocks adjacent and parallel to their lower edges; said latter shafts 20 projecting some distance ahead of the front edges of the corresponding pendulum blocks 19.

At their outer ends the freely rotatable longitudinal shafts 20 are each fitted with a pendulum head 21, and a pair of fruit impaling needles 22 upstands from each pendulum head 21, with the needles spaced lengthwise of the machine. Such needles 22 are adjustable laterally of the pendulum heads 21, dependent on the type of fruit being halved and pitted.

Figure 9:
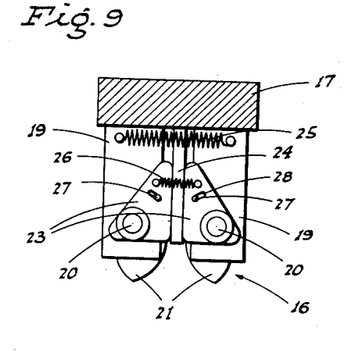
Fig. 9 is a rear end elevation of the same with the parts in their initial or starting position.

In their normal or initial positions the pendulum heads 21 are disposed in adjacent but spaced relation with the needles 22 upstanding in parallelism.

At the rear of each pendulum block 19 the corresponding shaft 20 is fitted with a triangular control plate 23 fixed to said shaft, and adjacent edges of said control plates 23 normally abut a depending stop flange 24 fixed to the mounting block 17; the pendulum blocks 19 being yieldably urged toward each other by a connecting tension spring 25.

Additionally, a relatively light-duty tension spring 26 connects between the apex parts of the triangular control plates 23, urging said plates toward each other when the pendulum blocks 19 are swung laterally outwardly. There are motion-limiting pins 27 on the rear ends of the pendulum blocks 19 working in arcuate slots 28 concentric to the shafts 20.

The purpose of the foregoing arrangement will hereinafter appear:

The Ferris wheel feeder, fruit supporting plate; and lower knife assembly

At the front of the machine, and at a convenient working height, the main frame 1 supports a Ferris wheel feeder, indicated generally at 29; such feeder comprising a cross shaft 30 having double-ended Ferris wheel arms 31 fixed to the ends thereof.

Figure 6:
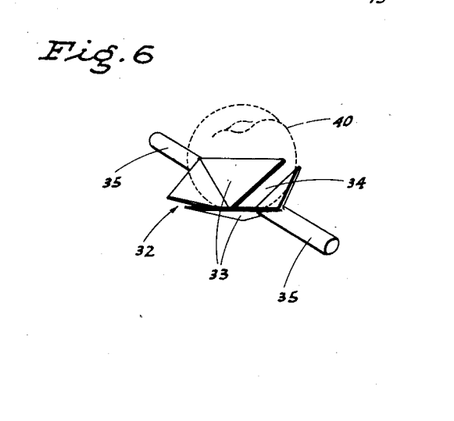
Fig. 6 is an enlarged fragmentary perspective view of one of the fruit receiving cups included in the Ferris wheel feeder.

Between corresponding ends of the Ferris wheel arms 31 there are fruit receiving pendulum cups, indicated generally at 32, and each such cup comprises cup-halves 33 in spaced-apart relation to provide a gap 34. The cup-halves 33 are each of flat-sided V'd configuration, as shown, and each is supported by a laterally outwardly projecting stub shaft 35 journaled in the adjacent arm 31; there being a pendulum 36 dependent from each stub shaft 35 whereby the cups 32 are always maintained in an upwardly opening position.

The above described Ferris wheel feeder 29 is driven, at predetermined speed, by an endless chain and sprocket unit 37 coupled to a countershaft 38 which is driven in turn from the crank shaft 11 by another endless chain and sprocket unit 39.

Fruit 40 is individually placed, manually, in the outermost fruit receiving cup 32, and thence carries inwardly on the Ferris wheel feeder 29; each fruit 40 being disposed in its cup 32 with the suture line of the fruit extending lengthwise of the machine; the Ferris wheel feeder 29 turning in the indicated direction.

As the cup-supported fruit reaches the inward mid-point position of the Ferris wheel feeder 29, such fruit is engaged from below by the notched upper end 41 of an upstanding fruit supporting plate 42 fixed in the main frame 1 at the front end portion thereof. The plate 42 projects through the gap 34 of each fruit receiving cup 32 to engage the fruit therein in cradling relation along the suture line. With continued turning of the Ferris wheel feeder 29, each fruit is left supported on said notched upper end 41 of the plate 42.

In order to prevent the fruit from toppling from such plate, a lower knife 43 comes to rest on top of such fruit before it is wholly freed from the cup 32; such lower knife being pivoted, as at 44, on the upper end of, and projecting forwardly from, a reciprocating post 45 which upstands rearwardly of the fruit supporting plate 42.

The upstanding post 45 is vertically adjustably secured, at its lower end portion, by pivots 46 to the forward ends of longitudinally extending, vertically swingable parallel linkage 47 pivoted, at its rear ends, as at 48, to a mount 49 included in frame 1.

The parallel linkage 47 is vertically oscillated by a rotary cam 50 having an internal cam track 51 in which a cam pin 52 runs; said pin being fixed on one of the linkage arms. The rotary cam 50 is fixed on and driven by the countershaft 38.

A tension rod 53 is connected to the lower knife 43 adjacent its inner end and thence extends downwardly in slidable relation through the upper end of a vertically elongated yoke 54, and a light-duty tension spring 55 is connected between the lower end of the tension rod 53 and the lower end of the yoke 54. In turn, a relatively heavier-duty tension spring 56 is connected between the lower end of the yoke 54 and an anchor ear 57 vertically adjustably secured at a lower point on the post 45.

Figure 1:
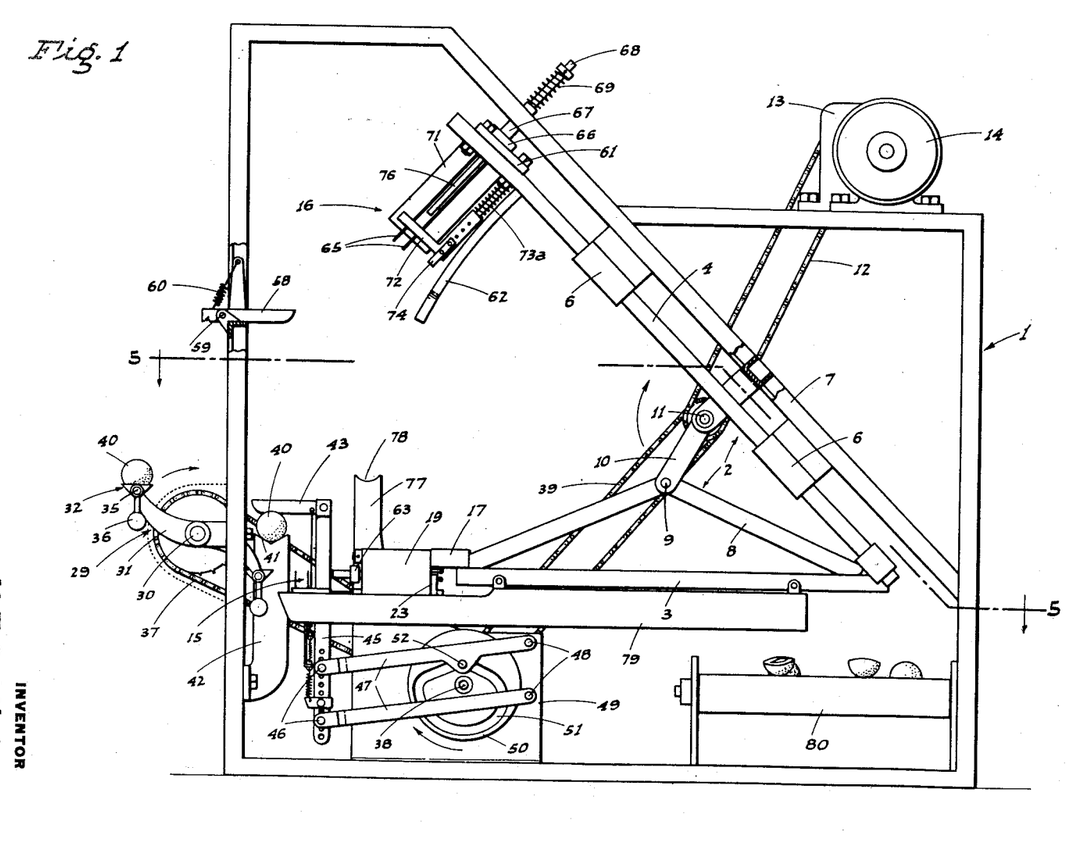
Fig. 1 is a side elevation of the novel fruit halving and pitting machine; the cyclic carrier being shown with the parts in the positions occupied thereby when the fruit holder is at the start of its up-stroke; one fruit being shown as fed to the fruit supporting plate and with the lower knife as initially engaging such fruit from above.

The cam track 51 is generally pear-shaped and is generated in a form so as to cause lowering of the post 45 in proper timed relationship to cause the lower knife 43 to engage the fruit 40 supported on the plate 42 a moment in advance of the cup 32 lowering away from said fruit. A fruit as so supported and engaged is shown in Fig. 1. The post 45 has sufficient continued downward travel to cause the light-duty tension spring 55 to urge the lower knife 43 downward with enough force to hold the fruit in place but not to cut into it.

Figure 11:
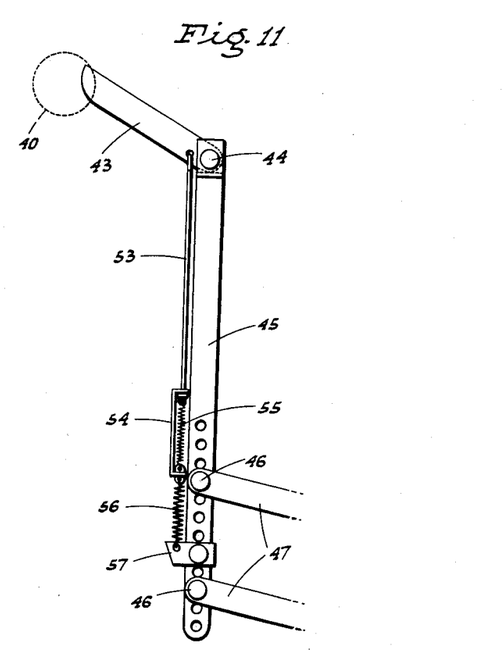
Fig. 11 is an enlarged fragmentary side elevation of the lower knife and its mount; the knife being shown during the course of its cutting operation.

After each fruit 40 is positioned on the fruit supporting plate 42 and initially engaged from above by the lower knife 43, the fruit holder 15 travels into engagement with such supported fruit from below, impaling the fruit on the upstanding needles 22, such needles running into the fruit on opposite sides of the pit. Thereafter, with continued upward travel of the fruit holder 15 in the cyclic path of the carrier 2, the post 45 and lower knife 43 follow upward for a short distance under the action of rotary cam 50. Then said cam reaches its dwell and the post and lower knife stop, causing the latter—which is rounded but sharpened at its outer end—to cant and cut into the fruit (see Fig. 11) on said continuing-to-rise holder and to slice such fruit along the suture line from top to bottom on the inner half and wholly to the stone. During this cutting operation the light-duty tension spring 55 runs to its limit, and the heavy-duty tension spring 56 comes into play to assure of proper down-pull on the knife 43 for the cutting operation.

Figure 2:
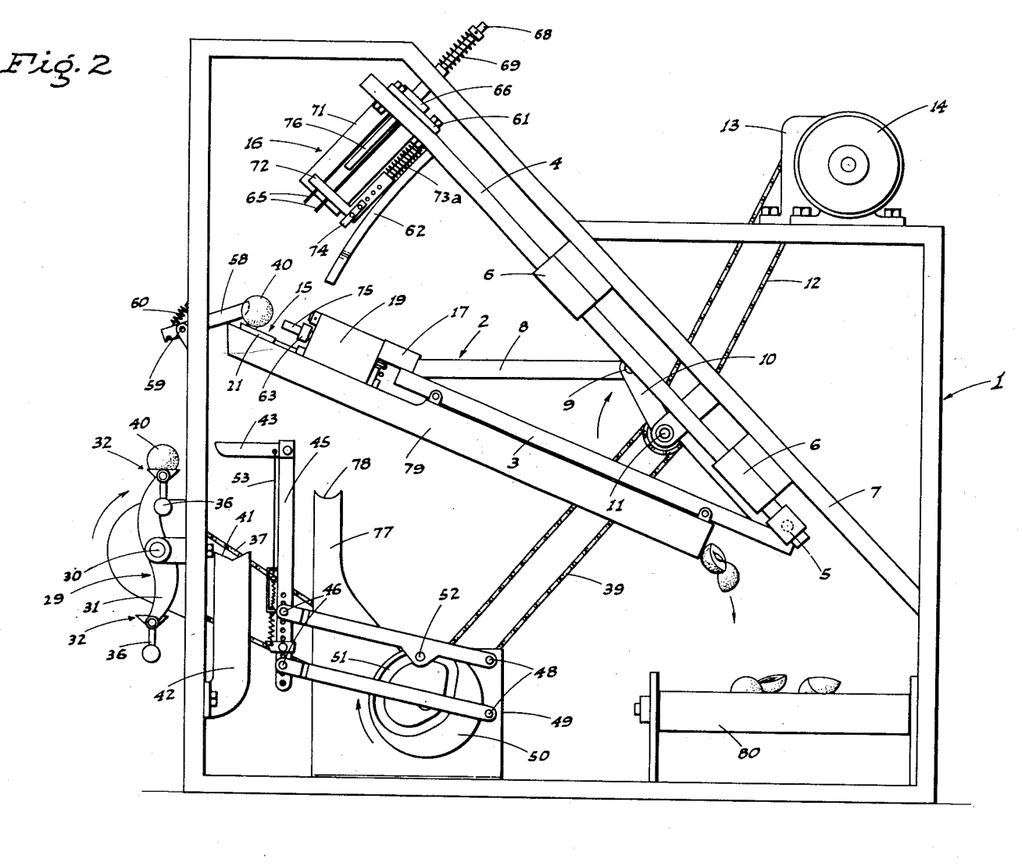
Fig. 2 is a similar view, but shows the fruit holder as raised by the cyclic carrier to a position with the supported fruit in engagement with the upper knife.

After the lower arms 3 raise sufficiently for the holder-supported fruit to be cut by, and to thence clear upwardly above, the lower knife 43, an upper knife 58, pivoted—as at 59—on the main frame 1 and projecting inwardly for upward yielding against a spring 60, engages the holder-supporting fruit 15 from above. As such fruit passes the upper knife 58 (see Fig. 2), said knife cants and slices the fruit along the suture line from top to bottom on the outer half, and wholly to the stone.

After functioning of the upper knife 58, and with continued motion of the lower arms 3 in their up-stroke, the fruit holder 15 and the fruit thereon sliced wholly to the stone in the plane of the suture line, comes into cooperative engagement with the pit ejection unit 16.

*Pit ejection unit*

Figure 3:
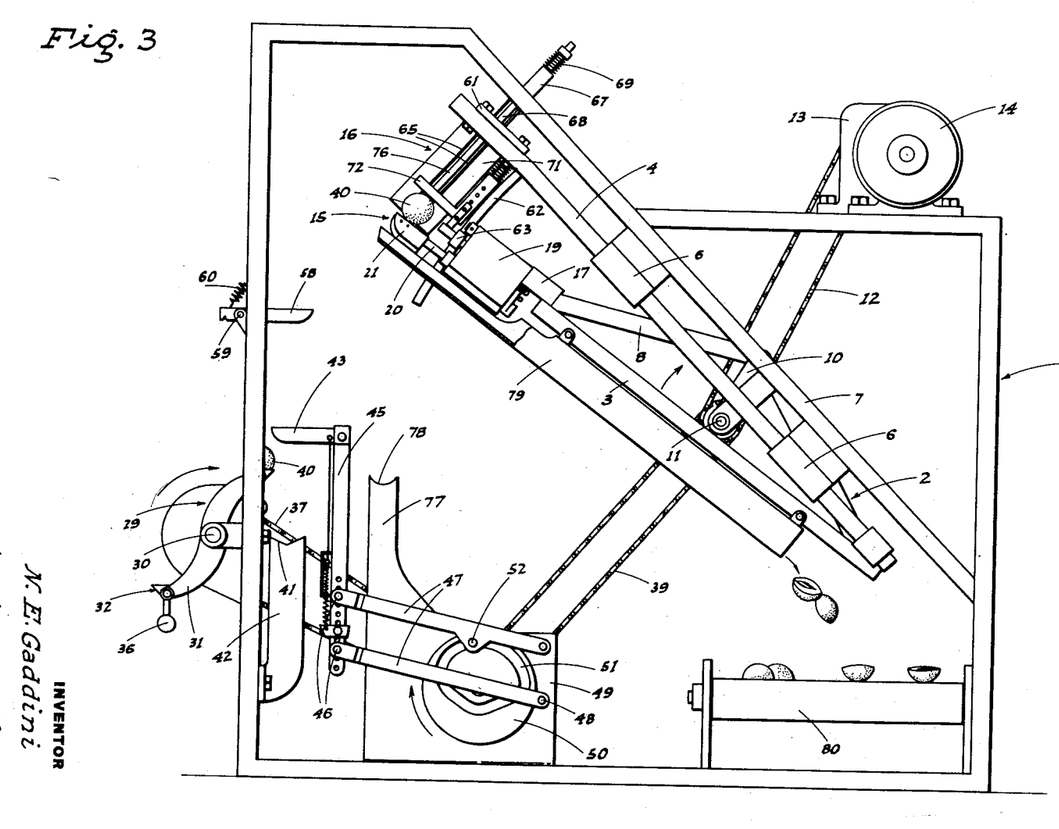
Fig. 3 is a similar but progressive view showing the cyclic carrier in position with the fruit holder cooperating with the pit ejection unit.
Figure 4:
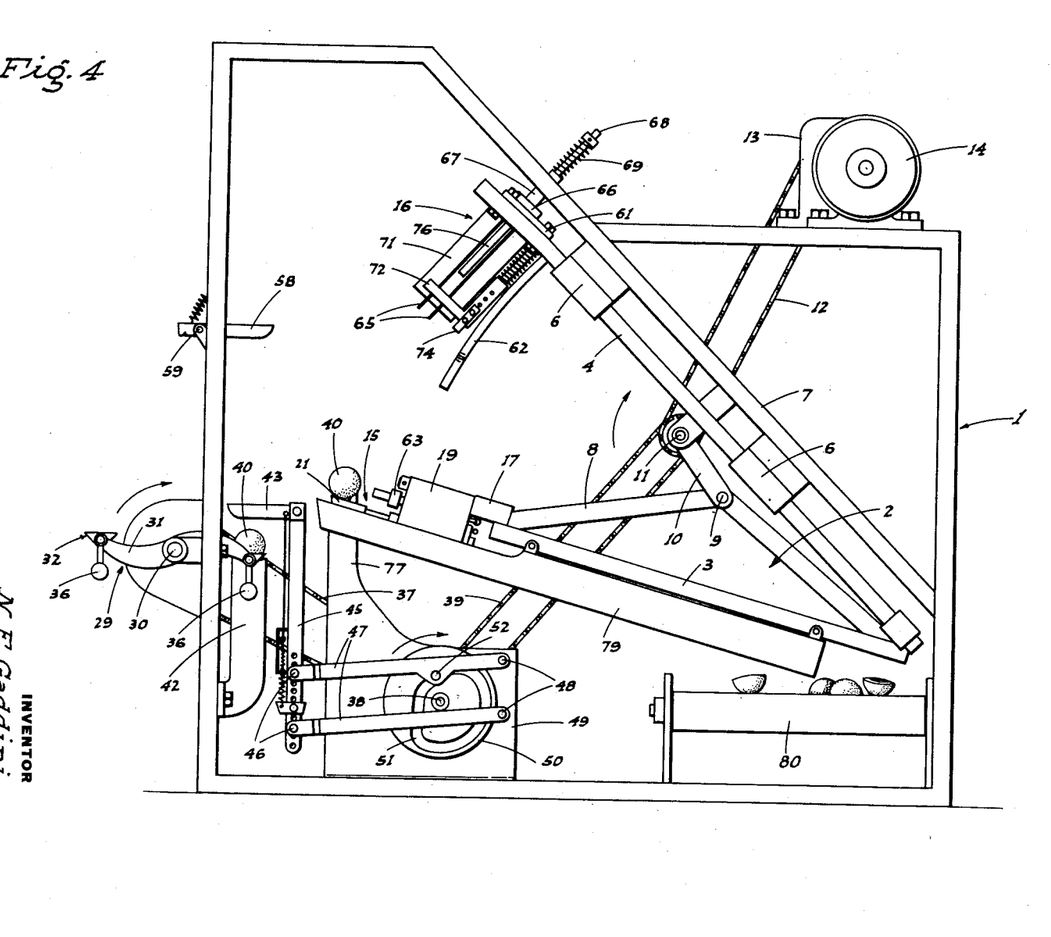
Fig. 4 is a similar but still further progressive view showing the cyclic carrier in position with the fruit holder in cooperation with the fruit stripping blade.
Figure 5:
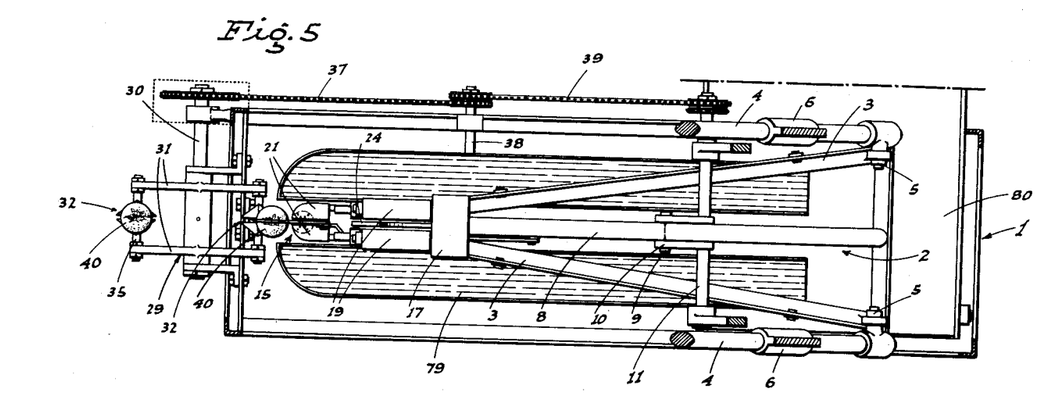
Fig. 5 is a sectional plan of the machine taken on line 5—5 of Fig. 1.

The pit ejection unit is constructed and functions as follows:

A cross plate 61 connects between the upper arms 4 at their forward ends, and a tongue cam 62 depends from such cross plate 61 intermediate its ends. As the fruit holder 15 rises into cooperative engagement with the pit ejection unit 16 (see Fig. 3), the tongue cam 62, which is double-edged or tapered, engages between cam rollers 63 on spindles 64 which project forwardly from the pendulum blocks 19 between the shafts 18 and 20, swinging said pendulum blocks laterally apart about the shafts 18 as an axis; i. e. from the position of Fig. 9 to the position of Fig. 10.

Figure 10:
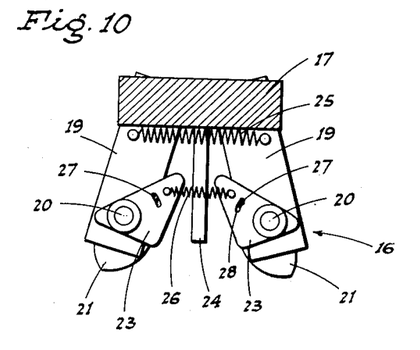
Fig. 10 is a similar view, but shows the position of the parts when the fruit holder is in cooperative engagement with the pit ejection unit.

As the pendulum blocks 19 are swung laterally apart similar motion is imparted to the pendulum heads 21, and they are caused to cant laterally inwardly at the top whereby the fruit halves on the upstanding needles 22 are separated at the bottom but maintained closely adjacent at the top. This inward canting of the pendulum heads 21 and upstanding needles 22 is caused by the spring-urged control plates 23; the yield of the tension spring 26 compensating for differential in fruit size and assuring that the fruit halves remain closely adjacent at the top.

After the fruit halves are so opened at the bottom, and with continued motion on the up-stroke of the lower arms 3, transversely spaced pairs of needles 65 penetrate the fruit halves on opposite sides of the stone; such needles extending upwardly in guided relation through the cross plate 61, and above the same are fixed to an enlarged flange 66 on the lower end of an upstanding sleeve 67. The sleeve 67 is vertically slidable on an upstanding, fixed guide shaft 68 on cross plate 61, and a compression spring 69 surrounds such shaft between the sleeve 67 and an upper stop collar 70.

A pit ejection plate 71 depends from the cross plate 61 between the pairs of needles 65, and the needles, on opposite sides of said plate, extend through and are guided by the lower portion of L-shaped guides 72, which lower portions also stabilize the pit ejection blade 71 laterally. The upstanding portions of the L-shaped needle guides 72 run on depending spindles 73 fixed to the cross plate 61; there being compression springs 73a about the spindles 73 between the guides 72 and said cross plates 61. Each of the L-shaped needle guides 72 includes, on the outside, a vertically adjustable block 74.

After initial penetration of the needles 65 relatively downwardly through the corresponding fruit halves, which needles 65 tend to confine the pit therebetween, the pit ejection blade 71—upon continued up-stroke of the lower arms 3—engages the pit and ejects it downwardly from between the fruit halves.

Figures 12, 13:
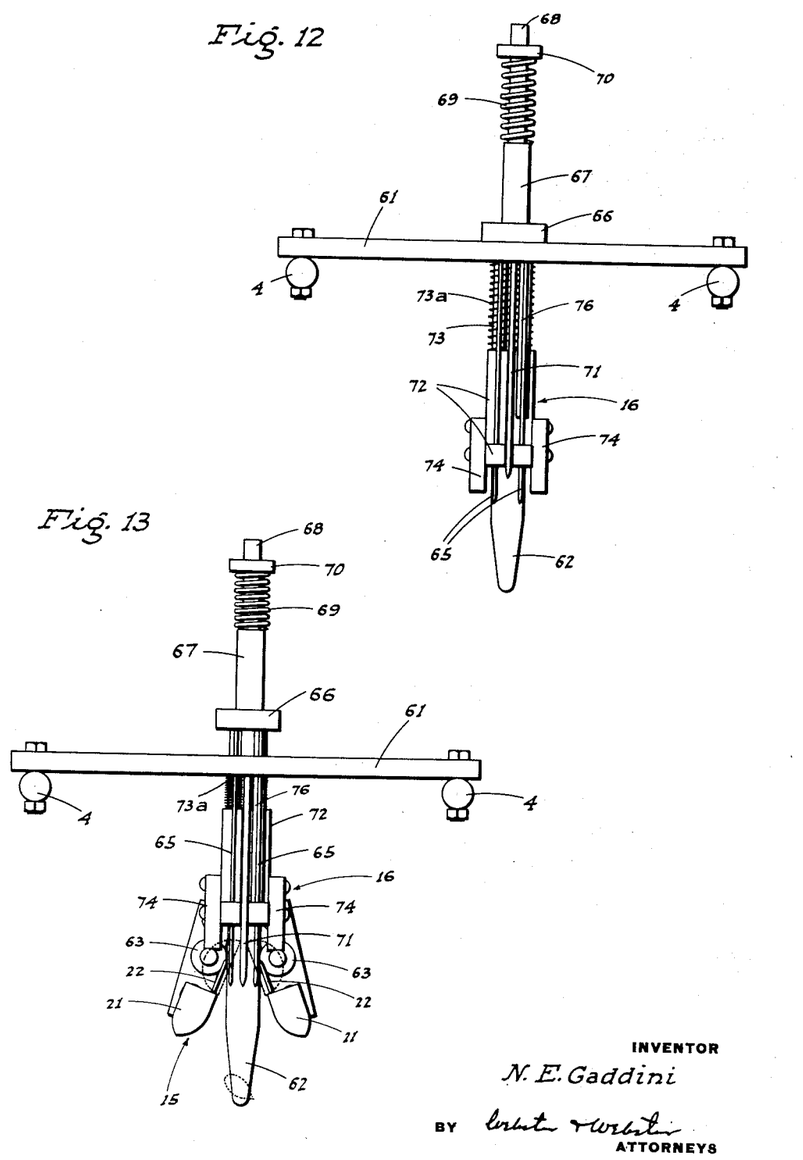
Fig. 12 is an enlarged fragmentary front end elevation showing the pit ejection unit in its initial or starting position.
Fig. 13 is a similar view, but shows such pit ejection unit with the fruit holder as raised into operative engagement therewith.

At substantially the same time axial bosses 75, which project from the cam rollers 63, abut the blocks 74 from below, urging the L-shaped needle guides 72 upwardly, whereby to clear the latter from the fruit halves. As the L-shaped needle guides 72 move upwardly they in turn abut against the lower end of pusher rods 76 which extend upwardly slidably through the cross plate 61 to fixed connection with the flange 66. As the guides 72 continue upward travel, toward completion of the up-stroke of the lower arms 3, the flange 66 and the sleeve 67 are moved upwardly a distance against the compression of spring 69, drawing the needles upwardly a distance to assure that they clear from the pit as ejected (see Fig. 13).

*Fruit half stripping and catching mechanism*

The fruit holder 15 on the lower arms 3 of the carrier 2, as actuated by the crank shaft 11 to simultaneously vertically oscillate said lower arms 3 and longitudinally reciprocate the upper arms 4, traverses a generally oval cyclic path in a longitudinally vertical plane; the up-stroke of said lower arms 3 and holder 15 occurring in the forward half of said oval cyclic path, and the down-stroke occurring in the rearward half of said path. In succession, during the course of such up-stroke, the holder 15 sweeps from below, impales and picks up the fruit 40 from the supporting plate 42; the impaled fruit is cut on opposite sides and circumferentially about the stone by the knives 43 and 58; and the pit is ejected by the pit ejection unit 16, all as aforesaid.

In the course of the down-stroke of each cyclic path, the parts of the fruit holder 15, after it lowers below and clears the pit ejection unit 16, return to normal position with the fruit halves closed.

Figure 7:
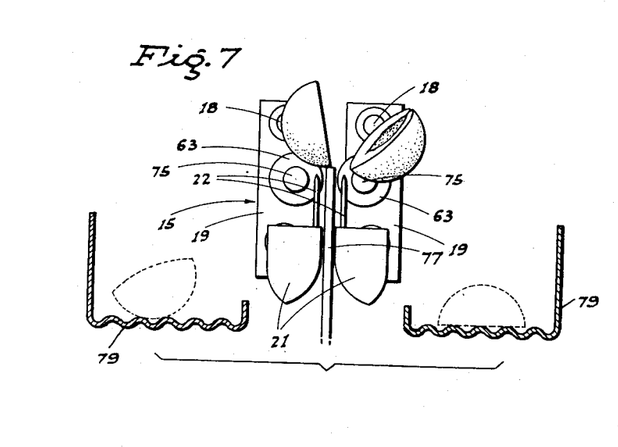
Fig. 7 is an enlarged fragmentary front end elevation showing the fruit holder in cooperation with the fruit stripping plate.

As the down stroke of the lower arms 3 and fruit holder 15 continues, said holder moves downward to the rear of the knife 43 and post 45, whereupon an upstanding fruit half stripping plate 77 concave on its upper end, as at 78, passes between the pendulum heads 21 and corresponding needles 22, engaging the fruit halves and stripping them from said needles. The fruit half stripping plate 77, post 45, and supporting plate 42 are disposed edgewise in alinement lengthwise of the machine.

As so stripped from the needles 22 the fruit halves fall laterally and downwardly into troughs 79 fixed lengthwise in connection with the corresponding lower arms 3 and thence projecting forwardly alongside the fruit holder 15. Such troughs are closed at their forward ends, corrugated on the bottom, and open at their rear ends.

With the cyclic action of the carrier 2 by the crank shaft 11, the fruit halves slide rearwardly in the troughs and discharge from their open rear ends onto a transverse carry-off conveyor 80.

After the fruit halves are stripped from the needles 22 and fall into the troughs 79, as above, the lower arms 3 and fruit holder 15 continue downward, completing the down stroke, whereupon the next cycle begins, with said arms and fruit holder sweeping upwardly to pick up the next fruit 40 deposited on the fruit supporting plate 42 by the Ferris wheel feeder 29. As is evident, the Ferris wheel feeder 29 rotates at half speed relative to the rotary cam 50 and crank shaft 11; this for the reason that said Ferris wheel feeder includes two of the fruit cups 32 in opposed relation, with each cup feeding to the fruit supporting plate 42 for one fruit halving and pitting cycle.

One of the advantages of the cyclic carrier 2 traversing an oval path in a longitudinal vertical plane is that different ones of the successive steps of the fruit halving and pitting operation can be carried out in spaced relation lengthwise of the machine; this being of special importance to obtain the fruit pick-up point (fruit supporting plate 42) forwardly disposed, and the fruit-half stripping point (stripping plate 77) rearwardly disposed. This not only makes for convenience of operation, but simplifies machine design.

The described fruit halving and pitting machine works—in its cycle of operation—smoothly and positively; the machine having substantial capacity; and the manual loading of fruit being accomplished by the simple expedient of placing fruit in the cups 32 as they rise at the front of the Ferris wheel feeder 29, the machine thereafter being wholly automatic in its function.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A fruit halving and pitting machine comprising a movable carrier, means to move the carrier alternately up and down in a predetermined path, a fruit holder on the carrier, said holder including laterally adjacent heads having upstanding needles thereon, said heads being mounted to swing apart, means responsive to the heads swinging apart operative to cant the same to dispose the needles in upwardly converging relation, means at a low point in said up-stroke to support a fruit for pick-up engagement by said head with the fruit impaled on the needles, knife means operative at an intermediate point in said up-stroke to halve the holder-supported fruit by slicing it circumferentially about the pit between the needle-supported halves, means operative at a high point in said up-stroke to swing said heads apart and eject the pit from between the fruit halves then open at the bottom and converging upwardly with the needles, and means operative in the down-stroke of said carrier to strip the fruit halves from said needles.

2. A fruit halving and pitting machine comprising a movable carrier, means to move the carrier alternately up and down in a predetermined path, a fruit holder on the carrier, said holder including adjacent but laterally spaced pendulum blocks adapted to swing apart, shafts projecting in parallel from said blocks in intersecting relation to the direction of travel, pendulum heads on said shafts, upstanding needles on the heads, and means responsive to the blocks swinging apart operative to cant the heads to dispose the needles in upwardly converging relation, means at a low point in said up-stroke to support a fruit for pick-up engagement by said heads with the fruit impaled on the needles, knife means operative at an intermediate point in said up-stroke to halve the holder-supported fruit by slicing it circumferentially about the pit between the needle-supported halves, means operative at a high point in said up-stroke to swing said blocks apart and eject the pit from between the fruit halves then open at the bottom and converging upwardly with the needles, and means operative in the down-stroke of said carrier to strip the fruit halves from said needles.

3. A fruit halving and pitting machine, as in claim 2, in which the shafts are turnable in the blocks; said head canting means including radial control elements projecting from said shafts, and a tension spring connecting said elements acting, when the blocks swing apart, to cause the shafts to rotate in directions to cant the heads and dispose the needles in said converging relation.

4. A fruit halving and pitting machine comprising a movable carrier, means to move the carrier alternately up and down in a predetermined path, a fruit holder on the carrier, said holder including laterally adjacent heads having upstanding needles thereon, said heads being mounted to swing apart, means responsive to the heads swinging apart operative to cant the same to dispose the needles in upwardly converging relation, means at a low point in said up-stroke to support a fruit for pick-up engagement by said head with the fruit impaled on the needles, knife means operative at an intermediate point in said up-stroke to half the holder-supported fruit by slicing it circumferentially about the pit between the needle-supported halves, cam means operative at a high point in said up-stroke operative to swing said heads apart, means operative upon continuance of the up-stroke adapted to pass relatively downward between the fruit halves to eject the pit therefrom, said fruit halves being open at the bottom and converging upwardly with the needles when the pit is so ejected, and means operative in the down-stroke of said carrier to strip the fruit halves from said needles.

5. A fruit halving and pitting machine comprising a movable carrier, means to move the carrier alternately up and down in a predetermined path, a fruit holder on the carrier, said holder including laterally adjacent heads having upstanding needles thereon, said heads being mounted to swing apart, means responsive to the heads swinging apart operative to cant the same to dispose the needles in upwardly converging relation, means at a low point in said up-stroke to support a fruit for pick-up engagement by said head with the fruit impaled on the needles, knife means operative at an intermediate point in said up-stroke to halve the holder-supported fruit by slicing it circumferentially about the pit between the needle-supported halves, a pit ejection unit cooperating with the holder at a high point in said up-stroke, said unit including a cam operative to swing the heads apart as the holder moves upwardly, other needles depending from the unit in position to then impale the respective fruit halves from above and with the pit therebetween, and a pit ejection blade between said other needles in position to pass between the fruit halves to engage and eject the pit with further upward motion of the holder; and means operative in the down-stroke of said carrier to strip the fruit halves from said needles.

6. A fruit halving and pitting machine, as in claim 5, in which said other needles are upwardly yieldably mounted in connection with the pit ejection unit, and means to cause said upward yielding of the other needles upon said further upward motion of the holder and the pit ejection blade passing between the fruit halves.

7. A fruit halving and pitting machine comprising a frame, a cyclic carrier, said carrier including upper and lower longitudinal arms pivotally connected at the rear and thence diverging forwardly, means mounting the upper arm on the frame for longitudinal reciprocation, power means connected to the lower arm operative to oscillate the same relative to the upper arm and to simultaneously reciprocate the latter to impart to the carrier a cyclic path of travel wherein the lower arm has a forward up-stroke and a rearward down-stroke, a fruit holder mounted on the forward end of the lower arm, means to dispose a fruit on the holder at a low point in the up-stroke of said lower arm, frame-supported knife means operative at an intermediate point in said up-stroke to halve the holder-supported fruit by slicing it circumferentially about the pit, the holder including means to separately support the fruit halves, a pit ejection unit including a depending pit ejection member, mounted on the forward end of the upper arm operative at a high point in said up-stroke to relatively project said member between the separately supported fruit halves on the holder to eject the pit from therebetween, and means operative in the down-stroke of said lower arm to release the fruit halves from the holder.

8. A fruit halving and pitting machine, as in claim 7, in which the means to dispose a fruit on the holder comprises a fruit support on the frame in position for fruit pick-up from below by said holder, and a Ferris wheel feeder mounted on the frame operative to deliver fruit to said support in succession and in predetermined timed relation to operation of said cyclic carrier.

9. A fruit halving and pitting machine comprising a frame, a cyclic carrier, said carrier including upper and lower longitudinal arms pivotally connected at the rear and thence diverging forwardly, means mounting the upper arm on the frame for longitudinal reciprocation, power means connected to the lower arm operative to oscillate the same relative to the upper arm and to simultaneously reciprocate the latter to impart to the carrier a cyclic path of travel wherein the lower arm has a forward up-stroke and a rearward down-stroke, a fruit holder mounted on the forward end of the lower arm, said fruit holder including forwardly projecting laterally spaced heads having upstanding needles thereon, an upstanding, narrow, fruit supporting plate mounted in connection with the frame in position to be straddled by the heads at a low point in the up-stroke of the lower arm whereby the fruit is impaled on said needles and carried upward with the holder, means to feed fruit to said supporting plate in predetermined timed relation to actuation of the cyclic carrier, frame-supported knife means operative at an intermediate point in said up-stroke to halve the holder-supported fruit by slicing it circumferentially about the pit, said knife means including an upwardly yieldable first knife and an upwardly yieldable second knife mounted to engage and slice the holder-supported fruit from top to bottom on opposite sides and between the needles on the heads, the knives working in a plane between the latter, a pit ejection unit including a depending pit ejection plate, mounted on the forward end of the upper arm operative at a high point in said up-stroke to relatively project said ejection plate between the head and needle-supported fruit halves to eject the pit from therebetween, and an upstanding stripping plate, mounted rearwardly of the fruit supporting plate, straddled by said heads on the down stroke whereby the fruit halves are stripped from the needles.

10. A fruit halving and pitting machine, as in claim 9, in which said first knife is mounted for up and down motion, and timed, power actuated means operative to lower said first knife into contact at the top with each fruit as fed to the supporting plate whereby to hold the fruit thereon for subsequent impaling from below on said needles; the timed, power actuated means raising said first knife to an elevated cutting point substantially simultaneously with corresponding motion of the holder with the fruit thereon.

11. A fruit halving and pitting machine, as in claim 10, in which the mounting means for said first knife includes a post upstanding rearwardly of and alined with the fruit supporting plate, said first knife being pivoted on and projecting forwardly from the post, tension spring means connected between said first knife and post, and a longitudinally extending, parallel linkage pivotally mounted in connection between the frame and said post; and said timed, power actuated means including a driven cam working the linkage; the heads straddling said post on the up-stroke.

12. A fruit halving and pitting machine comprising a frame, a cyclic carrier, said carrier including upper and lower longitudinal arms pivotally connected at the rear and thence diverging forwardly, means mounting the upper arm on the frame for longitudinal reciprocation, power means connected to the lower arm operative to oscillate the same relative to the upper arm and to simultaneously reciprocate the latter to impart to the carrier a cyclic path of travel wherein the lower arm has a forward up-stroke and a rearward down-stroke, a fruit holder mounted on the forward end of the lower arm, said fruit holder including forwardly projecting laterally spaced heads having upstanding needles thereon, an upstanding narrow, fruit supporting plate mounted in connection with the frame in position to be straddled by the heads at a low point in the up-stroke of the lower arm whereby the fruit is impaled on said needles and carried upward with the holder, a Ferris wheel feeder mounted on the frame at the front adapted to feed fruit in timed relation to actuation of the cyclic carrier, said Ferris wheel feeder including cups comprised of spaced-apart, pendulum-stabilized cup halves, and the halves of each cup straddling the fruit supporting plate upon feeding of each fruit thereto; frame-supported knife means operative at an intermediate point in said up-stroke to halve the holder-supported fruit by slicing it circumferentially about the pit, the holder including means to separately support the fruit halves, a pit ejection unit including a depending pit ejection member, mounted on the forward end of the upper arm operative at a high point in said up-stroke to relatively project said member between the separately supported fruit halves on the holder to eject the pit from therebetween, and means operative in the down-stroke of said lower arm to release the fruit halves from the holder.

13. A fruit halving and pitting machine comprising a frame, a cyclic carrier, said carrier including upper and lower longitudinal arms pivotally connected at the rear and thence diverging forwardly, means mounting the upper arm on the frame for longitudinal reciprocation, an A-frame upstanding from the lower arm, a transverse crank shaft above the frame below the upper arm and ahead of the pivotal connection of said arms, the crank arms being pivoted to the A-frame at the apex, power means to rotate the crank shaft whereby to simultaneously oscillate and reciprocate the lower arm to impart to the carrier a cyclic path of travel wherein the lower arm has a forward up-stroke and a rearward down-stroke, a fruit holder mounted on the forward end of the lower arm, means to dispose a fruit on the holder at a low point in the up-stroke of said lower arm, frame-supported knife means operative at an intermediate point in said up-stroke to halve the holder-supported fruit by slicing it circumferentially about the pit, the holder including means to separately support the fruit halves, a pit ejection unit including a depending pit ejection member, mounted on the forward end of the upper arm operative at a high point in said up-stroke to relatively project said member between the separately supported fruit halves on the holder to eject the pit from therebetween, and means operative in the down-stroke of said lower arm to release the fruit halves from the holder.

14. A fruit halving and pitting machine comprising a carrier having forwardly diverging upper and lower arms pivotally connected at the rear ends, a frame, means mounting the carrier in the frame to allow of longitudinal reciprocation of the carrier, power mechanism mounted on the frame and connected to the carrier and arranged to simultaneously reciprocate the same and oscillate the lower arm relative to the upper arm, a fruit holder on the lower arm, means mounted on the frame and cooperating with the holder and operative on the up-stroke of the lower arm to slice holder-supported fruit about the pit into separate halves, means included with the holder to separately support said fruit halves, a pit ejecting unit mounted on the upper arm in position to cooperate with halved fruit on the holder upon said lower arm reaching the top of its up-stroke to then eject the pit from the fruit and a member mounted on the frame in position to engage the holder-supported and pitted fruit halves upon the downstroke of said lower arm to release said fruit halves from the holder.

15. In a fruit halving and pitting machine having a cyclic carrier which includes upper and lower longitudinal arms pivotally connected at their rear ends and thence diverging forwardly, means mounting the upper arm for longitudinal reciprocation, means connected to the lower arm to oscillate the same relative to the upper arm for movement between a substantially horizontal position and a sloping position downward away from the forward end thereof, a fruit holder mounted on the lower arm adjacent the forward end, and means to halve and then pit the fruit on the holder upon reciprocation of the carrier; a trough fixed on the lower arm substantially parallel thereto and in position to receive halved fruit as discharged from the holder, the trough being open at its end opposite the holder, and means to reciprocate the carrier lengthwise of the arms and including a connection with the lower arm to swing the same on its pivot upon reciprocation of the carrier to dispose the lower arm and trough at said downward slope after the fruit has been received in the trough so that the fruit will roll to the open end of said trough for discharge therefrom.

NORMAN E. GADDINI.

References Cited in the file of this patent

UNITED STATES PATENTS

| Number | Name | Date |
|---|---|---|
| 384,371 | Lillie | June 12, 1888 |
| 794,598 | Dunkley | July 11, 1905 |
| 1,403,852 | Ensele | Jan. 17, 1922 |
| 1,407,524 | Fourchy | Feb. 21, 1922 |
| 1,489,455 | Paranteau | Apr. 18, 1924 |
| 1,726,685 | Tottenham | Sept. 3, 1929 |
| 2,336,123 | Perrelli et al. | Dec. 7, 1943 |
| 2,376,526 | Thompson | May 22, 1945 |
| 2,403,516 | Gaddini | July 9, 1946 |
| 2,403,517 | Gaddini | July 9, 1946 |